S. THOMAS.
NUT LOCK.
APPLICATION FILED AUG. 30, 1918.

1,311,727.

Patented July 29, 1919.

WITNESSES
Geo. W. Naylor
C. Bradway.

INVENTOR
S. Thomas.
BY
ATTORNEYS

UNITED STATES PATENT OFFICE.

STEPHEN THOMAS, OF NEW YORK, N. Y.

NUT-LOCK.

1,311,727.  Specification of Letters Patent.  Patented July 29, 1919.

Application filed August 30, 1918. Serial No. 252,076.

*To all whom it may concern:*

Be it known that I, STEPHEN THOMAS, a citizen of the United States, and a resident of the city of New York, borough of Manhattan, in the county and State of New York, have invented a new and Improved Nut-Lock, of which the following is a full, clear, and exact description.

This invention relates to a nut lock of that type embodying a washer and adapted to be keyed to the bolt or other threaded member and having portions which are adapted to be upset or bent into contact with the nut to prevent turning of the latter.

The invention has for its general objects to improve the construction of devices of this character so as to be reliable and efficient in use, comparatively simple and inexpensive to manufacture, and so designed as to be easily manipulated.

A more specific object of the invention is the provision of a nut lock of novel construction in the form of a washer made of two pieces, one of hard metal and the other of soft metal, whereby the soft metal section can be bent or shaped to engage the side or sides of the nut while the hard metal section is keyed to the bolt or threaded member.

With such and other objects in view, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a sectional view of a bolt and nut with the nut-locking device applied thereto;

Figure 1:
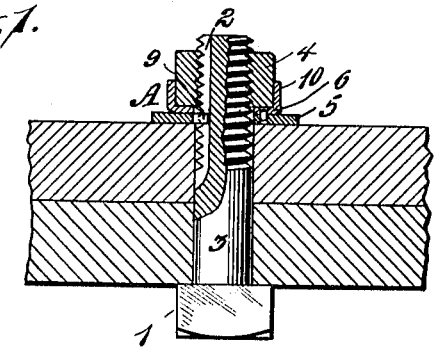
Figure 3:
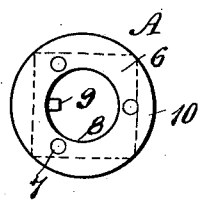
Fig. 3 is a plan view of the nut lock in its normal condition before being applied to a bolt and nut.
Figure 2:
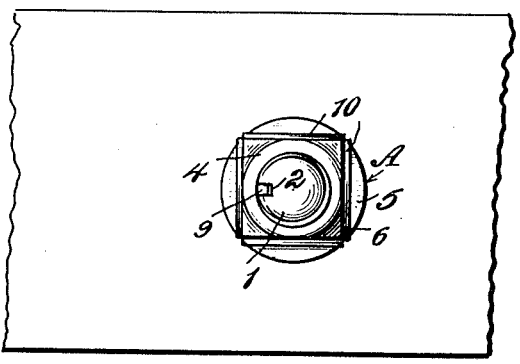
Fig. 2 is a face view of the nut lock in use.
Figure 4:
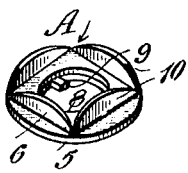
Fig. 4 is a perspective view of the nut lock, showing the same in nut-locking condition.

Referring to the drawing, 1 designates a bolt or threaded member which has a longitudinal slot or keyway 2 in the threaded shank 3 thereof. On the bolt is an ordinary nut 4 which is held in place by a nut lock A. This nut lock comprises a washer made of two sections 5 and 6, the first being of hard metal and the other of soft or easily bendable metal. These two sections are secured together by rivets 7 located close to the bolt-receiving opening 8. The section 5 is keyed on an inwardly extending lug 9 which engages in the slot 2 of the bolt to prevent the nut lock from turning on the latter. The peripheral portion 10 of the section 6 of the nut lock can be bent upwardly, as shown in Figs. 1 and 4, to form stop members to engage the side faces of the nut to prevent the latter from turning. The section 6 can be bent up at only one point, if desired, to engage a face of the nut, or it can be bent up at a plurality of points to engage all faces of the nut. To remove the nut it is merely necessary to bend the members 10 downwardly in the normal plane of the section 6, whereupon the nut can freely turn on the bolt.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A nut lock comprising a washer-like body made of an outer piece of metal and an inner piece of metal riveted together, the two pieces of metal having openings which register, the inner piece being of harder metal than the outer piece and being provided with a key for engaging a bolt at a key-slot therein, the outer piece of metal having its periphery free to permit bending into nut engaging position.

2. In combination with a bolt having a key-slot, a nut lock comprising a washer-like body made of an outer piece of metal and an inner piece of metal secured together, the inner piece being of harder metal than the outer piece and being provided with a key for moving in the key-slot, the outer piece having its periphery free to permit bending into engagement with a nut mounted on the bolt.

3. A nut lock comprising a washer-like body made of an outer piece of metal and an inner piece of metal, the two pieces of metal being secured together to prevent one from moving longitudinally of its axis and from rotating relatively to the other, the two pieces of metal having openings which register, the inner piece being of harder metal than the outer piece, the outer piece of metal having its periphery free to permit bending into nut engaging position, and a key on the inner piece of metal extending radially in its opening for engaging a bolt at a key slot therein for locking the nut at any desired point on the bolt while permitting the rotation of a member mounted on the bolt adjacent the inner piece of the washer-like body.

4. In combination with a bolt having a key slot, a nut lock comprising a washer-like body having an outer piece of metal and an inner piece of metal, the two pieces of metal being secured together to prevent one from moving longitudinally of the bolt and from rotating relatively to the other, the inner piece being of harder metal than the outer piece, the outer piece having its periphery free to permit bending into engagement with a nut mounted on the bolt, and a key on the inner piece extending radially inwardly in the key slot for locking the nut at any desired point on the bolt while permitting the rotation of a member mounted on the bolt and spaced from the inner piece of the washer-like body.

STEPHEN THOMAS.